US012583323B2

(12) United States Patent　　　(10) Patent No.: US 12,583,323 B2
Kim et al.　　　　　　　　　　　　(45) Date of Patent: Mar. 24, 2026

(54) NON-CONTACT INTERFACE DEVICE AND METHOD FOR CONTROLLING THE SAME

(71) Applicants: HYUNDAI MOTOR COMPANY, Seoul (KR); KIA CORPORATION, Seoul (KR); Korea Institute of Science and Technology, Seoul (KR)

(72) Inventors: Dong Gu Kim, Suwon-si (KR); Jang Hyeon Lee, Hwaseong-si (KR); Dae Sung Kwon, Seoul (KR); Hyun Soo Kim, Suwon-si (KR); Il Seon Yoo, Suwon-si (KR); Byung Chul Lee, Seoul (KR); Seong Hun Cho, Seoul (KR); Seung Hyub Baek, Seoul (KR); Min Seok Kim, Seoul (KR); Soo Young Jung, Seoul (KR)

(73) Assignees: Hyundai Motor Company, Seoul (KR); Kia Corporation, Seoul (KR); Korea Institute of Science And Technology, Seoul (KR)

( * ) Notice: Subject to any disclaimer, the term of this patent is extended or adjusted under 35 U.S.C. 154(b) by 218 days.

(21) Appl. No.: 18/514,493

(22) Filed: Nov. 20, 2023

(65) Prior Publication Data

US 2025/0033471 A1　　Jan. 30, 2025

(30) Foreign Application Priority Data

Jul. 27, 2023　(KR) ........................ 10-2023-0098044

(51) Int. Cl.
　　*B60K 35/60*　　　(2024.01)
　　*B60K 35/10*　　　(2024.01)
　　　　(Continued)

(52) U.S. Cl.
　　CPC .............. *B60K 35/60* (2024.01); *G06F 3/016* (2013.01); *G06F 3/017* (2013.01); *G06F 3/043* (2013.01);
　　　　(Continued)

(58) Field of Classification Search
　　CPC ........ B60K 35/60; B60K 35/10; B60K 35/25; B60K 2360/115; B60K 2360/126;
　　　　(Continued)

(56) References Cited

U.S. PATENT DOCUMENTS

| | | | |
|---|---|---|---|
| 11,947,789 B2 * | 4/2024 | Joshi ................... | G06F 3/04883 |
| 2010/0149182 A1 * | 6/2010 | Butler .................... | G06F 3/011 |
| | | | 345/424 |

(Continued)

FOREIGN PATENT DOCUMENTS

| | | |
|---|---|---|
| CN | 104460973 B | 6/2019 |
| KR | 10-2018-0126707 A | 11/2018 |

(Continued)

OTHER PUBLICATIONS

D. R. Large, et al., "Feel the noise: Mid-air ultrasound haptics as a novel human-vehicle interaction paradigm," Applied Ergonomics, vol. 81, 2019.

(Continued)

*Primary Examiner* — Grant Sitta
(74) *Attorney, Agent, or Firm* — Morgan Lewis & Bockius LLP

(57) ABSTRACT

A non-contact interface device for a vehicle and a method for controlling the same, may display an operation system menu for a driver and passengers to operate various kinds of devices of the vehicle as a hologram, enable a user to operate the displayed operation system menu in a non-contact manner by use of the user's finger or the like, and provide the user with a tactile feedback for a non-contact operation, so (Continued)

that the user can recognize whether to have operated the menu.

18 Claims, 6 Drawing Sheets

(51) Int. Cl.

| | |
|---|---|
| *B60K 35/25* | (2024.01) |
| *G06F 3/01* | (2006.01) |
| *G06F 3/043* | (2006.01) |
| *G06F 3/0482* | (2013.01) |
| *G06V 20/56* | (2022.01) |
| *G06V 40/10* | (2022.01) |
| *G06V 40/20* | (2022.01) |

(52) U.S. Cl.
CPC ............ *G06F 3/0482* (2013.01); *G06V 20/56* (2022.01); *G06V 40/10* (2022.01); *G06V 40/28* (2022.01); *B60K 35/10* (2024.01); *B60K 35/25* (2024.01); *B60K 2360/115* (2024.01); *B60K 2360/126* (2024.01); *B60K 2360/1464* (2024.01); *B60K 2360/29* (2024.01); *B60K 2360/774* (2024.01)

(58) Field of Classification Search
CPC ........ B60K 2360/1464; B60K 2360/29; B60K 2360/774; B60K 2360/21; B60K 35/00; G06F 3/016; G06F 3/017; G06F 3/043; G06F 3/0482; G06F 3/011; G06F 3/0304; G06F 3/005; G06F 3/04842; G06V 20/56; G06V 40/10; G06V 40/28; B60W 50/08; B60W 50/14; B60W 50/16; B60W 2050/146; B60R 16/005; B60R 16/0231; G03H 1/04
See application file for complete search history.

(56) References Cited

U.S. PATENT DOCUMENTS

| | | | | |
|---|---|---|---|---|
| 2018/0298959 A1* | 10/2018 | Battlogg | ............... | F16D 57/002 |
| 2021/0286434 A1 | 9/2021 | Brummel et al. | | |
| 2022/0334405 A1* | 10/2022 | Iliffe-Moon | ........... | B60K 35/22 |
| 2023/0099288 A1* | 3/2023 | Wang | ................... | B06B 1/0625 |
| | | | | 345/156 |
| 2023/0185237 A1* | 6/2023 | Yang | ........................ | G03H 1/02 |
| | | | | 359/11 |
| 2024/0329741 A1* | 10/2024 | Kao | ....................... | H04N 23/61 |

FOREIGN PATENT DOCUMENTS

| | | |
|---|---|---|
| WO | 2019/106118 A1 | 6/2019 |
| WO | 2020/131020 A1 | 6/2020 |
| WO | 2020/141330 A2 | 7/2020 |

OTHER PUBLICATIONS

T. Singhal, et al., "Elevating Haptics: An Accessible and Contactless Elevator Concept with Tacitle Mid-Air Controls," 2021 Conference on Human Factors in Computing Systems, 2021.

* cited by examiner

Present disclosure

Related art

NON-CONTACT INTERFACE DEVICE AND METHOD FOR CONTROLLING THE SAME

CROSS-REFERENCE TO RELATED APPLICATION

The present application claims priority to Korean Patent Application No. 10-2023-0098044 filed on Jul. 27, 2023, the entire contents of which is incorporated herein for all purposes by this reference.

BACKGROUND OF THE PRESENT DISCLOSURE

Field of the Present Disclosure

The present disclosure relates to a non-contact interface device and a method for controlling the same, and more particularly, to a non-contact interface device and a method for controlling the same, which can operate various kinds of devices of a vehicle by a non-contact operation.

Description of Related Art

According to the trend of technology advancement of an autonomous vehicle, driver's driving intervention is being minimized, and if an autonomous vehicle of not less than level 4, which does not require the driver's driving intervention, is spread, time for rest, business, or other leisure activities will be able to be freely guaranteed during vehicle movement.

Along with the technological advances of such an autonomous vehicle, there has been a demand for schemes for all passengers to be able to utilize a human machine interface (hereinafter, referred to as an "HMI") of a future mobility, through getting out of the driver-centric design of the HMI.

For example, if a mobility such as a purpose built vehicle (PBV) is released, it is required that the HMI, through which everyone in the mobility is able to perform an operation related to business, shopping, infotainment, or the like without being limited by his or her seating position, is mounted in the mobility.

On the other hand, as an attention to hygiene is continuously increased all over the world due to the COVID-19, changes from the conventional physical button based contact HMI to a non-contact HMI have been promoted in various industries.

Accordingly, the HMI which is mounted on an autonomous vehicle or a future mobility has been required to satisfy a multifunctional interface which is flexible and morphable, to be operable by all drivers and passengers without being limited by their seating positions, and to include non-contact operation and haptic feedback functions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a non-contact interface device for a vehicle and a method for controlling the same, which can display an operation system menu for a driver and passengers to operate various kinds of devices of the vehicle as a hologram, enable a user to operate the displayed operation system menu in a non-contact manner by use of the user's finger or the like, and provide the user with a tactile feedback for a non-contact operation, so that the user can recognize whether to have operated the menu.

The object of the present disclosure is not limited to that as described above, and other unmentioned objects of the present disclosure may be clearly understood from the following description by those of ordinary skill in the art to which the present disclosure pertains (hereinafter, "ordinary technicians").

In various aspects of the present disclosures, an exemplary embodiment of the present disclosure provides a non-contact interface device, which includes: an annular body portion rotatably mounted on an internal component of a vehicle: a display mounted on a lower portion of the body portion and configured to display an operation system image: a hologram plate mounted on an internal portion of the body portion and configured to generate a hologram image through penetration of the operation system image being displayed on the display: a camera mounted on a predetermined position of the body portion and configured to detect a user's finger or palm operation: a plurality of ultrasonic elements mounted on an internal periphery of the body portion and configured to provide a tactile feedback to a user; and a controller operatively connected to the display, the camera and the plurality of ultrasonic elements and configured to control the display to display the operation system image thereon and to control operations of the ultrasonic elements based on a recognition signal of the camera.

The display is mounted to be inclined at a predetermined angle on the lower portion of the body portion, and the hologram plate is mounted on the internal portion of the body portion in a horizontal arrangement state.

Therefore, a display angle and a display position of the hologram image are determined in accordance with an angle between the display and the hologram plate.

An ultrasonic element alignment plate for mounting the plurality of ultrasonic elements at predetermined intervals is attached to the internal periphery of the body portion.

Preferably, at least two row alignment holes for mounting the ultrasonic elements therein are formed in a zig-zag arrangement along a circumferential direction on the ultrasonic element alignment plate.

The controller is configured to control the ultrasonic elements to continuously operate for a predetermined time period to provide a continuous tactile feedback to the user upon determining that a user's finger or palm is put on a position where the user's finger or palm is able to operate the hologram image based on a detection signal of the camera.

The controller is configured to determine input coordinates of an operation system to determine what menu of the operation system the user has selected in response that the user performs an input operation of the operation system which is displayed as the hologram image based on a detection signal of the camera.

The controller is configured to instantaneously operate the ultrasonic elements to provide the user with the tactile feedback notifying that the menu of the operation system has been selected after determining the input coordinates of the operation system.

The body portion is rotatably mounted on a moving console among internal components of the vehicle.

For this, a ball bearing is mounted between a bottom portion of the body portion and an upper surface of the moving console.

In various aspects of the present disclosures, another exemplary embodiment of the present disclosure provides a method for controlling a non-contact interface device, which includes: displaying a hologram image through penetration of an operation system display image of a display mounted on a body portion through a hologram plate: detecting, by a camera mounted on the body portion, a user's finger or palm operation: determining, by a controller, whether a user's finger or palm is put on a position where the user's finger or palm is able to operate the hologram image based on a detection signal of the camera; primarily operating, by the controller, a plurality of ultrasonic elements mounted on the body portion to primarily provide a user with a tactile feedback if it is identified that the user's finger or palm is put on the position where the user's finger or palm is able to operate the hologram image: determining, by the controller, input coordinates for a menu of an operation system selected by the user among menus of the operation system being displayed as the hologram image based on the detection signal of the camera; and secondarily operating, by the controller, the plurality of ultrasonic elements to secondarily provide the user with the tactile feedback notifying the user that the menu of the operation system has been selected.

In the step of primarily operating the ultrasonic elements, the controller is configured to control the ultrasonic elements to continuously operate for a predetermined time period.

In the step of secondarily operating the ultrasonic elements, the controller is configured to control the ultrasonic elements to instantaneously operate for a predetermined time.

Through the means for solving the above problems, the present disclosure provides the following effects.

First, it is possible to provide user interface convenience by displaying the operation system menu for operating various kinds of devices of the vehicle as the hologram and enabling the displayed operation system menu to be operated in the non-contact manner by use of the user's finger or the like.

Second, it is possible to provide a hygienic effect, such as COVID-19 prevention by enabling all of the driver and the passengers in the vehicle to operate various kinds of desired devices of the vehicle in the non-contact manner.

Third, it is possible for the user to easily recognize whether to have selected the operation system menu which is displayed as the hologram image by providing the tactile feedback through the ultrasonic elements during the user's non-contact operation.

Fourth, it is possible to improve the sound pressure level for the tactile feedback in contrast to the conventional single ultrasonic element by mounting the plurality of ultrasonic elements in the at least two row alignment holes of the ultrasonic element alignment plate.

Fifth, because the plurality of ultrasonic elements are mounted in the at least two row alignment holes of the ultrasonic element alignment plate including an annular shape, it is possible to maintain the sound pressure level for the tactile feedback to be almost equal to the sound pressure level of the conventional flat plate array on which the plurality of ultrasonic elements are mounted although the number of mounted ultrasonic elements is greatly reduced in comparison to that of the conventional flat array, and thus it is possible to save the manufacturing cost.

Sixth, because the body portion of the non-contact interface device according to an exemplary embodiment of the present disclosure is rotatably mounted on the moving console, any passenger in the vehicle is able to operate the interface device in the non-contact manner through movement of the moving console and rotation of the body portion, and thus it is possible to greatly improve the user interface convenience.

Other aspects and exemplary embodiments of the present disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present disclosure have other features and advantages which will be apparent from or are set forth in more detail in the accompanying drawings, which are incorporated herein, and the following Detailed Description, which together serve to explain certain principles of the present disclosure. The above and other features of the present disclosure are discussed infra.

Figure 1:
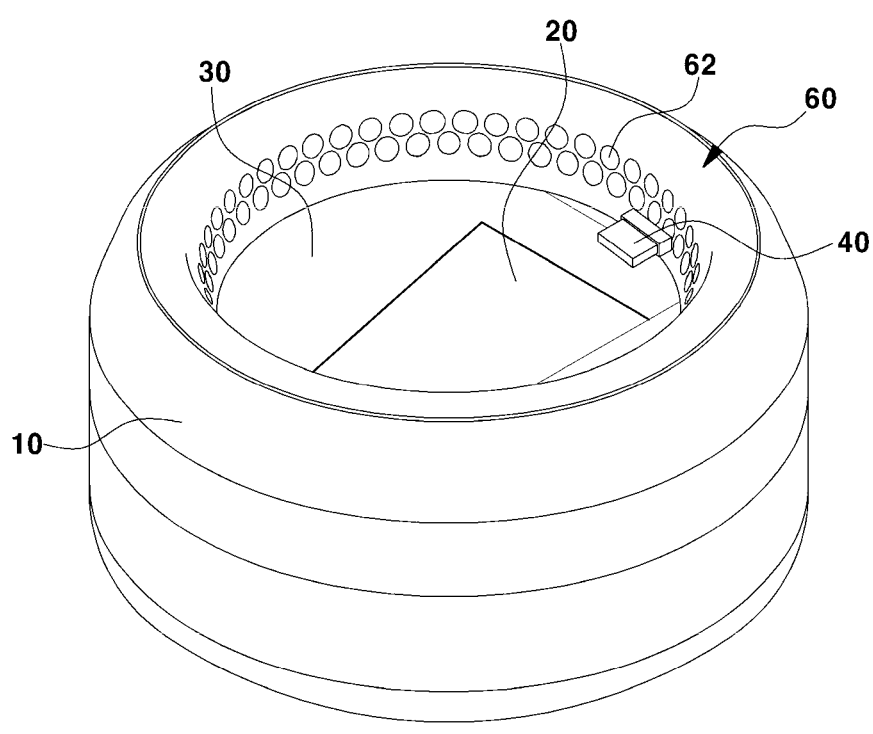
FIG. 1 is a perspective view exemplarily illustrating a non-contact interface device according to an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The aspects and features of the present disclosure and methods for achieving the aspects and features will be apparent by referring to various exemplary embodiments to be described in detail with reference to the accompanying drawings. However, the present disclosure is not limited to the exemplary embodiments included hereinafter, and it may be implemented in diverse forms. The exemplary embodiments are provided to assist those of ordinary skill in the art in a comprehensive understanding of the present disclosure, and the present disclosure is only defined within the scope of the appended claims. In the whole description, the same reference numerals denote the same constituent elements.

Furthermore, in the description, the terms, such as "first and/or second", are for discriminating constituent elements having the same name from each other, but the constituent elements should not be limited by the terms.

The detailed description may exemplify the present disclosure. Furthermore, the above-described contents are to explain exemplary embodiments of the present disclosure, and the present disclosure may be used in various other combinations, modifications, and environments. That is, the present disclosure may be modified or changed within a range of the concept of the present disclosure included in the description, a range equivalent to the included contents as described above, and/or a range of technology or knowledge in the industry. The described embodiments are to explain the best state for implementing the technical idea of the present disclosure, and various modifications required in the detailed application field and usage of the present disclosure are possible. Accordingly, the foregoing detailed explanation of the present disclosure is not intended to limit the present disclosure to the disclosed exemplary embodiments of the present disclosure. Furthermore, it should be interpreted that the appended claims include other embodiments.

Hereinafter, an exemplary embodiment of the present disclosure will be described in detail with reference to the accompanying drawings.

Figure 2:
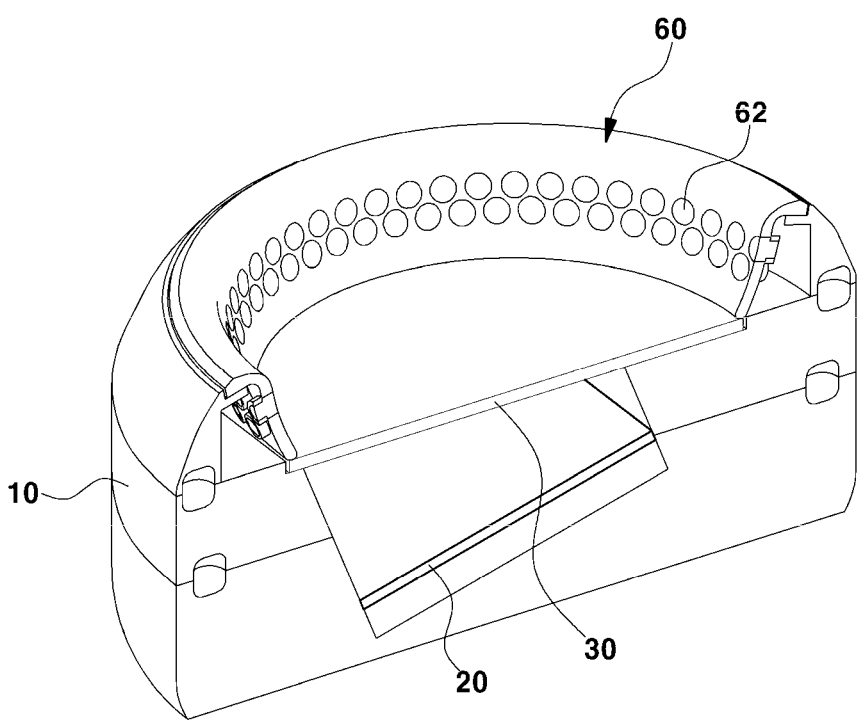
FIG. 2 is a cross-sectional perspective view exemplarily illustrating a non-contact interface device according to an exemplary embodiment of the present disclosure.
Figure 3:
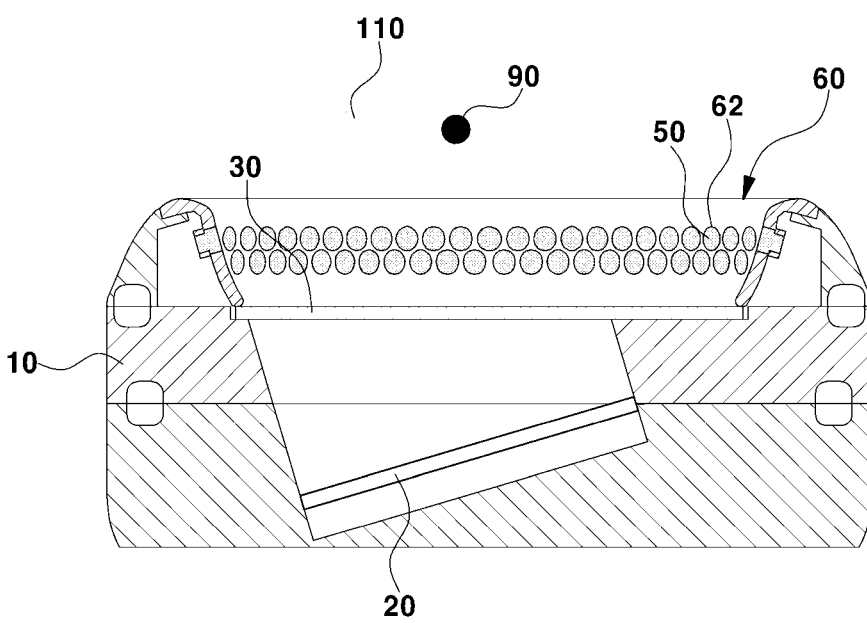
FIG. 3 is a cross-sectional view exemplarily illustrating a non-contact interface device according to an exemplary embodiment of the present disclosure.
Figure 4:
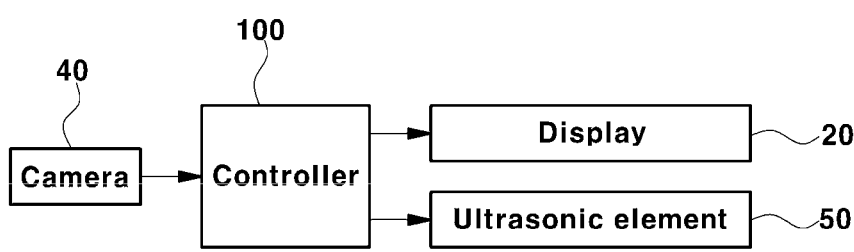
FIG. 4 is a control block diagram for a non-contact interface device according to an exemplary embodiment of the present disclosure.

Accompanied FIG. 1, FIG. 2, and FIG. 3 illustrate a non-contact interface device according to an exemplary embodiment of the present disclosure, and FIG. 4 is a control block diagram for a non-contact interface device according to an exemplary embodiment of the present disclosure.

As illustrated in FIGS. 1, 2, and 3, a non-contact interface device according to an exemplary embodiment of the present disclosure includes an annular body portion 10 as a framework.

The body portion 10 may be rotatably mounted on an internal component of a vehicle.

For example, the body portion 10 may be rotatably mounted on a moving console among internal components of the vehicle.

A display 20 is mounted on a lower portion of the body portion 10, and a hologram plate 30 including a medium film for generating a hologram is mounted on an upper position of the display 20 on an internal portion of the body portion 10.

The display 20 displays an operation system display image for operating various kinds of devices of the vehicle by a command signal of a controller 100 operatively connected to the display 20, and the hologram plate 30 generates a hologram image around a focal point 90 which is set on the hologram plate 30 through penetration of the operation system display image of the display 20 in accordance with the known hologram generation principle.

For this, the display 20 is mounted to be inclined at a predetermined angle on the lower portion of the body portion 10, and the hologram plate 30 is mounted on the internal portion of the body portion 10 in a horizontal arrangement state in the middle of a vertical direction thereof.

Therefore, the focal point 90 that corresponds to a display angle and a display position of the hologram image depending on an angle between the display 20 and the hologram plate 30 may be determined.

For example, if the display 20 is mounted to be inclined at an angle of 30° to 60° on the lower portion of the body portion 10, and the hologram plate 30 is mounted on the internal portion of the body portion 10 in the horizontal arrangement state in the middle of the vertical direction, as illustrated in FIG. 3, the display angle of the hologram image being generated by the hologram plate 30 may be determined at the angle of 30° to 60° around the focal point 90.

Accordingly, the operation system image of the display 20 may penetrate the hologram plate 30, and may be displayed as a non-contact operable virtual hologram image 110 on a user's finger or palm around the focal point 90 in an upper space of the hologram plate 30.

A camera 40 for detecting a user's finger or palm operation is mounted on a predetermined internal position of the body portion 10, that is, on a boundary position between an internal surface of the body portion 10 and an upper surface of the hologram plate 30.

Therefore, the camera 40 detects whether the user's finger or palm is put on a position where the user's finger or palm is able to operate the hologram image in a non-contact manner, and detects a motion for the user's finger or palm to perform an input operation of a menu of an operation system which is displayed as the hologram image to transmit the detected motion to the controller 100.

A plurality of ultrasonic elements 50 are mounted on an internal periphery of the body portion 10, and the ultrasonic elements 50 may operate to provide a tactile feedback to the user when the user's finger or palm is put on the position where the user's finger or palm is able to operate the hologram image, or may operate to provide the tactile feedback to the user when the user performs selection operation of the operation system menu of the hologram image.

For this, an ultrasonic element alignment plate 60 for mounting the plurality of ultrasonic elements 50 thereon is attached onto the internal periphery of the body portion 10.

The ultrasonic element alignment plate 60 is provided as an annular plate structure including a predetermined thickness, of which the diameter becomes larger as going from a lower end portion thereof toward an upper end portion thereof, and is provided as a structure in which 2-row alignment holes 62 for mounting the plurality of ultrasonic elements 50 are formed in zig-zag along a circumferential direction thereof.

Figure 7:
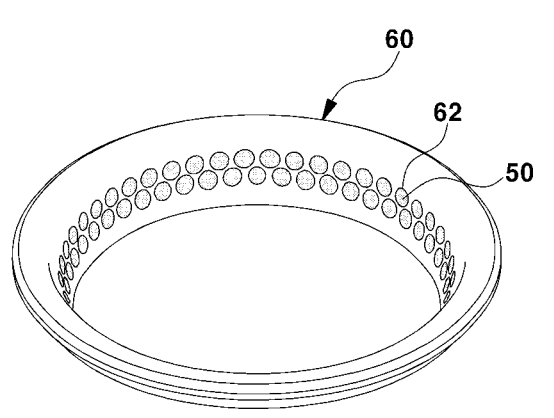
FIG. 7 is an image diagram of an ultrasonic element alignment plate of a non-contact interface device according to an exemplary embodiment of the present disclosure in comparison to the conventional flat-plate ultrasonic element alignment plate.
Figure 7:
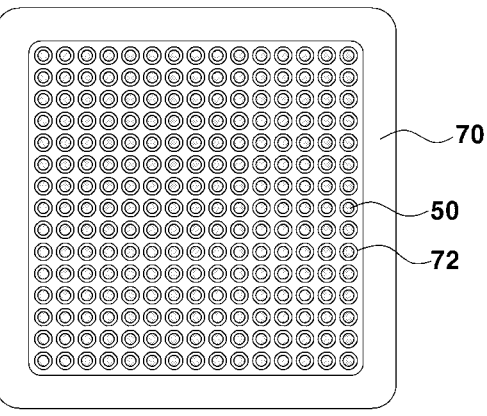

Referring to accompanied FIG. 7, the ultrasonic element alignment plate 60 includes a structure in which 156 2-row alignment holes 62 for mounting the ultrasonic elements are formed along the circumferential direction, and 156 ultrasonic elements 50 in total may be mounted thereon, whereas a flat ultrasonic element alignment plate 70 which is applied to the conventional non-contact interface system includes a structure in which 256 alignment holes 72 for mounting the ultrasonic elements are formed in horizontal and vertical directions, and 256 ultrasonic elements 50 in total are to be mounted therein. Accordingly, in case of using the ultrasonic element alignment plate 60 according to an exemplary embodiment of the present disclosure, the number of mounted ultrasonic elements may be reduced, and thus the number of components and the manufacturing cost may be reduced.

Furthermore, because 156 ultrasonic elements 50 being mounted and inserted into the 2-row alignment holes 62 of the ultrasonic element alignment plate 60 are disposed in zig-zag along the circumferential direction around the focal point where the hologram image is generated, the sound pressure level (about 164 dbSPL) for the tactile feedback being generated by 156 ultrasonic elements 50 may be determined almost similar to the sound pressure level (about 164 dbSPL) being generated by 256 ultrasonic elements 50 being mounted and inserted into the conventional flat ultrasonic element alignment plate 70.

Because all the 156 ultrasonic elements 50 being mounted and inserted into the 2-row alignment holes 62 of the ultrasonic element alignment plate 60 maintain the same distance from the focal point where the hologram image is generated, the sound pressure level for the tactile feedback being generated by the respective ultrasonic elements 50 may be focused on the focal point and its surroundings, and thus the sound pressure level (about 164 dbSPL) being generated by the 156 ultrasonic elements 50 being mounted and inserted into the 2-row alignment holes 62 of the ultrasonic element alignment plate 60 may be determined almost similar to the sound pressure level (about 164 dbSPL) being generated by the 256 ultrasonic elements 50 being mounted and inserted into the conventional flat ultrasonic element alignment plate 70.

Although the number of ultrasonic elements 50 mounted on the ultrasonic element alignment plate according to an exemplary embodiment of the present disclosure is further reduced in comparison to the number of ultrasonic elements mounted on the conventional flat ultrasonic element alignment plate 70, the sound pressure level (about 164 dbSPL) for the tactile feedback being generated by the ultrasonic elements 50 mounted on the ultrasonic element alignment plate 60 according to an exemplary embodiment of the present disclosure may be determined to be equal to the sound pressure level (about 164 dbSPL) for the tactile feedback being generated by the ultrasonic elements mounted on the conventional flat ultrasonic element alignment plate 70.

Meanwhile, the controller 100 is configured to control the display 10 to display the operation system image for operating various kinds of devices of the vehicle thereon, and to control operations of the ultrasonic elements 50 based on a detection (recognition) signal of the camera 40.

Furthermore, the controller 100 operatively connected to the ultrasonic elements 50 is configured to control the ultrasonic elements 50 to continuously operate for a predetermined time period to provide the continuous tactile feedback to the user if it is determined that the user's finger or palm is put on the position where the user's finger or palm is able to operate the hologram image based on the detection signal of the camera 40.

Furthermore, the controller 100 is configured to determine input coordinates of the operation system (e.g., coordinate values when the user operates an input of a menu of the operation system which is displayed as a hologram image with the user's finger) to determine what menu of the operation system the user has selected in response that the user performs an input operation of the operation system which is displayed as the hologram image based on the detection signal of the camera.

Furthermore, the controller 100 is configured to instantaneously operate the ultrasonic elements 50 for a predetermined time to provide the user with the tactile feedback notifying that the menu of the operation system has been selected after determining the input coordinates of the operation system.

Meanwhile, the non-contact interface device according to an exemplary embodiment of the present disclosure may be rotatably mounted on a moving console 80 among internal components of the vehicle so that all the driver and passengers in the vehicle can operate the non-contact interface.

Figure 5:
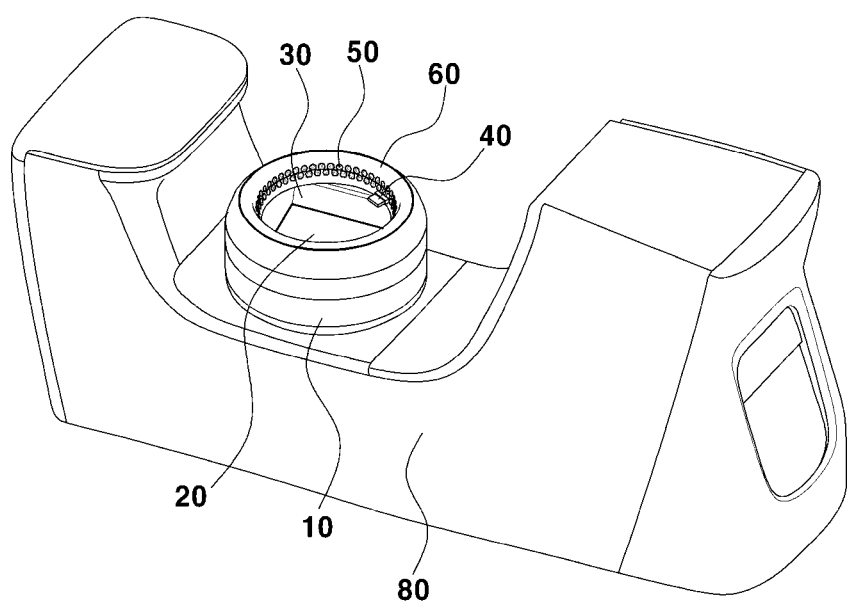
FIG. 5 is a perspective view exemplarily illustrating a state in which a non-contact interface device according to an exemplary embodiment of the present disclosure is mounted on a moving console.
Figure 6:
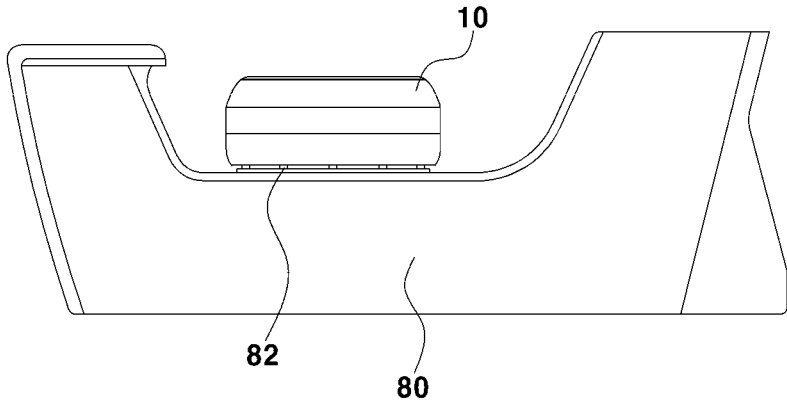
FIG. 6 is a side view exemplarily illustrating a state in which a non-contact interface device according to an exemplary embodiment of the present disclosure is mounted on a moving console.

For this, as illustrated in FIG. 5 and FIG. 6, in a state that the body portion 10 is rotatably mounted on the moving console 80, a ball bearing 82 may be mounted between a bottom portion of the body portion 10 and an upper surface of the moving console 80.

Hereinafter, the operation flow of the non-contact interface device of the present disclosure including the above-described constitution will be described.

Figure 8:
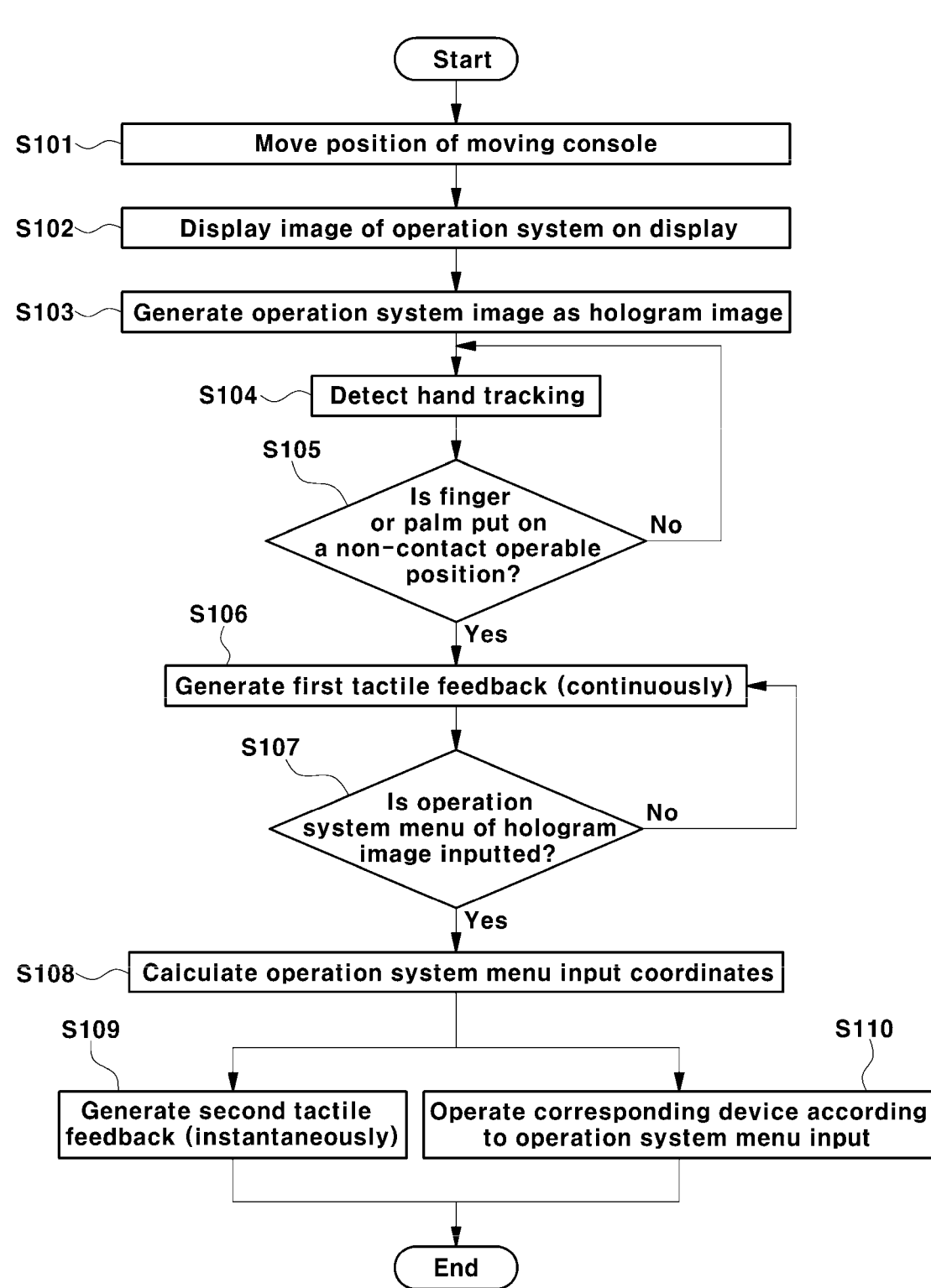
FIG. 8 is a flowchart illustrating a method for controlling a non-contact interface device according to an exemplary embodiment of the present disclosure.

Accompanied FIG. 8 is a flowchart illustrating a method for controlling a non-contact interface device according to an exemplary embodiment of the present disclosure.

First, for a passenger in a vehicle to use the non-contact interface device, the moving console 80 may move to a position where the passenger is present under the control of the controller 100 (S101).

Accordingly, an operation system image for operating various kinds of devices of the vehicle is displayed on the display 20 by a command signal of the controller 100 (S102).

In succession, the operation system image being displayed on the display 20 may penetrate the hologram plate 30, and may be generated as a virtual hologram image 110 around a focal point 90 in an upper space of the hologram plate 30 (S103).

For example, as the display 20 is mounted to be inclined at an angle of 30° to 60° at one side position on a lower end portion of the body portion 10, and the hologram plate 30 is mounted on an internal portion of the body portion 10 in a horizontal arrangement state in the middle of a vertical direction, the hologram image (operation system image) which is generated by the hologram plate 30 as illustrated in FIG. 3 may be generated with a slope of 30° to 60° around the focal point.

Furthermore, because the hologram image (operation system image) is generated with the slope of 30° to 60° around the focal point, the user can stably operate the hologram image (operation system image) in a non-contact manner by use of the user's finger or palm.

In other words, if the hologram image (operation system image) is generated in a vertical direction around the focal point, the user is required to perform the non-contact operation in a state where the user's finger or palm is maximally bent to cause the user to be uncomfortable. However, because the hologram image (operation system image) is generated with the slope of 30° to 60° around the focal point, the user can stably and conveniently operate the hologram image (operation system image) in the non-contact manner by use of the user's finger or palm.

In the instant case, to easily operate the hologram image in the non-contact manner, the passenger may rotate the body portion 10 around the ball bearing 82.

That is, for the user to stably operate the hologram image in the non-contact manner by use of the user's finger or palm, the passenger may rotate the body portion 10 in a desired direction around the ball bearing 82.

Next, a hand tracking operation that means the user's finger or palm operation is detected by the camera 40 mounted on the body portion 10 (S104).

Accordingly, based on the detection signal of the camera 40, the controller 100 judges whether the user's finger or palm is put on the position where the user's finger or palm can operate the hologram image (S105).

If it is identified that the user's finger or palm is put on the position where the user's finger or palm can operate the hologram image as the result of judgment in the step S105, the controller 110 is configured to control the plurality of ultrasonic elements 50 mounted on the body portion to primarily operate to generate a primary tactile feedback (S106).

In the instant case, to provide a continuous tactile feedback to the user, the ultrasonic elements 50 may continuously operate for a predetermined time period to generate the primary tactile feedback.

In other words, because 156 ultrasonic elements 50 being mounted and inserted into the 2-row alignment holes 62 of the ultrasonic element alignment plate 60 continuously generate the sound pressure level (about 164 dbSPL) for the tactile feedback for the predetermined time period, the user can feel the primary tactile feedback, like haptic vibrations, through the user's finger or palm, and thus the user is able to know that the user's finger or palm is accurately put on the position where the user's finger or palm can operate the hologram image in the non-contact manner.

Next, the controller 100 judges whether the user operates the operation menu of the hologram image by use of the user's finger or palm (S107).

That is, based on the detection signal of the camera 40, the controller 100 judges whether the user operates the menu of the operation system being displayed as the hologram image in the non-contact manner by use of the user's finger or palm.

If it is judged that there is the non-contact operation using the user's finger or palm as the result of the judgment in the step S107, the controller 100 is configured to determine the input coordinates of the menu of the operation system that the user selects by use of the user's finger or palm (S108).

That is, based on the detection signal of the camera 40, the controller 100 is configured to determine the input coordinates of the menu of the operation system that the user selects by use of the user's finger or palm among menus of the operation system being displayed as the hologram image, since the method of converting the detection signal of the camera 40 into the input coordinates of the menu is generally know, detailed explanation is omitted.

For example, because the controller 100 comes to know the coordinate value for the menu of the operation system which is selected by the user in the non-contact manner based on the detection signal of the camera 40 in a state where coordinate values for menus of the operation system which is displayed as the hologram image are predetermined, the controller 100 can recognize what menu of the operation system the user has selected.

In succession, the controller 100 may be configured for controlling the plurality of ultrasonic elements 50 to secondarily operate, so that the ultrasonic elements 50 generate a secondary tactile feedback notifying the user that the selection of the menu of the operation system has been completed.

In other words, after determining the input coordinate for the menu of the operation system selected by the user by use of the user's finger or palm, the controller 100 may be configured for controlling the 156 ultrasonic elements 50 mounted and inserted into the 2-row alignment hole 62 of the ultrasonic element alignment plate 60 to instantaneously operate for a predetermined time, so that the ultrasonic elements 50 instantaneously generate the sound pressure level (about 164 dbSPL) for the tactile feedback for the certain time. Accordingly, the user can feel a secondary tactile feedback like haptic vibrations through the user's finger or palm, and thus the user can recognize that the selection of the desired menu of the operation system has been completed.

Meanwhile, by controlling the vehicle device or appliance corresponding to the menu of the operation system which is selected by the user to secondarily operate, the controller 100 can operate the vehicle device or appliance selected by the user. (S110)

In an exemplary embodiment of the present disclosure, by controlling the vehicle device or appliance corresponding to the menu of the operation system which is selected by the user (S110) as well as controlling the plurality of ultrasonic elements 50 to secondarily operate (S109), the controller 100 can operate the vehicle device or appliance selected by the user.

As described above, it is possible to provide user interface convenience by displaying the operation system menu for operating various kinds of devices of the vehicle as the hologram and enabling the displayed operation system menu to be operated in the non-contact manner by use of the user's finger or the like.

Furthermore, because the body portion of the non-contact interface device according to an exemplary embodiment of the present disclosure is rotatably mounted on the moving console, any passenger in the vehicle is able to operate the interface device in the non-contact manner through movement of the moving console and rotation of the body portion, and thus it is possible to greatly improve the user interface convenience.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A non-contact interface apparatus, comprising:
   a body portion;
   a display mounted on a lower portion of the body portion and configured to display an operation system image;
   a hologram plate mounted on an internal portion of the body portion and configured to generate a hologram image through penetration of the operation system image being displayed on the display;
   a camera mounted on a predetermined position of the body portion and configured to detect an operation of a body part of a user;
   a plurality of ultrasonic elements mounted on an internal periphery of the body portion and configured to provide a tactile feedback to the user; and
   a controller operatively connected to the display, the camera and the plurality of ultrasonic elements and configured to control the display to display the operation system image thereon and to control operations of the plurality of ultrasonic elements based on a detection signal of the camera,
   wherein the plurality of ultrasonic elements are mounted on an ultrasonic element alignment plate formed as an annular plate structure in the non-contact interface apparatus.

2. The non-contact interface apparatus of claim 1, wherein the body portion is rotatably mounted on an internal component of a vehicle.

3. The non-contact interface apparatus of claim 1, wherein the display is mounted to be inclined at a predetermined angle on the lower portion of the body portion, and the hologram plate is mounted on the internal portion of the body portion in a horizontal arrangement state.

4. The non-contact interface apparatus of claim 1, wherein a display angle and a display position of the hologram image are determined in accordance with an angle between the display and the hologram plate.

5. The non-contact interface apparatus of claim 1, wherein the ultrasonic element alignment plate for mounting the plurality of ultrasonic elements at predetermined intervals is attached to the internal periphery of the body portion.

6. The non-contact interface apparatus of claim 5, wherein at least two row alignment holes for mounting the plurality of ultrasonic elements therein are formed in a zig-zag arrangement along a circumferential direction on the ultrasonic element alignment plate.

7. The non-contact interface apparatus of claim 6, wherein the ultrasonic element alignment plate is formed as an annular plate structure including a predetermined thickness, of which a diameter becomes larger as going from a lower end portion thereof toward an upper end portion thereof.

8. The non-contact interface apparatus of claim 1, wherein the controller is further configured to control the plurality of ultrasonic elements to continuously operate for a predetermined time period to provide continuously the tactile feedback to the user upon concluding that the body part of the user is put on a position where the body part of the user is able to operate the hologram image based on the detection signal of the camera.

9. The non-contact interface apparatus of claim 1, wherein the controller is further configured to determine menu input coordinates of an operation system to determine what menu of the operation system the user has selected in response that the user performs an input operation of the operation system which is displayed as the hologram image based on the detection signal of the camera.

10. The non-contact interface apparatus of claim 9, wherein the controller is further configured to instantaneously operate the plurality of ultrasonic elements to provide the user with the tactile feedback notifying that the menu of the operation system has been selected after determining the input coordinates of the operation system.

11. The non-contact interface apparatus of claim 9, wherein the controller is further configured to control corresponding device according to the selected menu of the operation system.

12. The non-contact interface apparatus of claim 1, wherein the body portion is rotatably mounted on a moving console among internal components of a vehicle.

13. The non-contact interface apparatus of claim 12, wherein a ball bearing is mounted between a bottom portion of the body portion and an upper surface of the moving console.

14. A method for controlling a non-contact interface apparatus, the method comprising:

displaying a hologram image through penetration of an operation system display image of a display mounted on a body portion through a hologram plate of the non-contact interface apparatus;

detecting, by a camera mounted on the body portion, an operation of a body part of a user;

determining, by a controller operatively connected to the camera, whether the body part of the user is put on a position where the body part of the user is able to operate the hologram image based on a detection signal of the camera;

primarily operating, by the controller, a plurality of ultrasonic elements mounted on the body portion to provide the user with a tactile feedback upon concluding that the body part of the user is put on the position where the body part of the user is able to operate the hologram image;

determining, by the controller, input coordinates for a menu of an operation system selected by the user among menus of the operation system being displayed as the hologram image based on the detection signal of the camera; and secondarily operating, by the controller, the plurality of ultrasonic elements to provide the user with the tactile feedback notifying the user that the menu of the operation system has selected, wherein the plurality of ultrasonic elements are mounted on an ultrasonic element alignment plate formed as an annular plate structure in the non-contact interface apparatus.

15. The method of claim 14, wherein in the primarily operating of the plurality of ultrasonic elements, the controller is further configured to control the plurality of ultrasonic elements to continuously operate for a predetermined time period.

16. The method of claim 14, wherein in the secondarily operating of the plurality of ultrasonic elements, the controller is further configured to control the plurality of ultrasonic elements to instantaneously operate for a predetermined time.

17. The method of claim 14, wherein the controller is configured to control corresponding device according to the selected menu of the operation system.

18. A non-transitory computer readable storage medium on which a program for performing the method of claim 14 is recorded.

* * * * *